United States Patent
Kano

(10) Patent No.: US 7,187,093 B2
(45) Date of Patent: Mar. 6, 2007

(54) TERMINAL CONNECTION PART STRUCTURE OF ELECTRIC MOTOR WITH SPEED REDUCTION MECHANISM

(75) Inventor: Masami Kano, Gunma (JP)

(73) Assignee: Mitsuba Corporation, Gunma (JP)

( * ) Notice: Subject to any disclaimer, the term of this patent is extended or adjusted under 35 U.S.C. 154(b) by 274 days.

(21) Appl. No.: 10/508,774

(22) PCT Filed: Mar. 20, 2003

(86) PCT No.: PCT/JP03/03433

§ 371 (c)(1),
(2), (4) Date: Sep. 23, 2004

(87) PCT Pub. No.: WO03/081751

PCT Pub. Date: Oct. 2, 2003

(65) Prior Publication Data
US 2005/0151432 A1    Jul. 14, 2005

(30) Foreign Application Priority Data
Mar. 25, 2002  (JP) .............................. 2002-083431

(51) Int. Cl.
*H02K 7/00* (2006.01)
(52) U.S. Cl. ........................ 310/71; 310/239
(58) Field of Classification Search .................. 310/71, 310/238, 239, 241
See application file for complete search history.

(56) References Cited
U.S. PATENT DOCUMENTS

| | | | | |
|---|---|---|---|---|
| 4,056,749 A | * | 11/1977 | Carison et al. ............. | 310/239 |
| 4,398,135 A | * | 8/1983 | Busch et al. ................ | 318/443 |
| 5,382,857 A | * | 1/1995 | Schellhorn et al. ........... | 310/83 |
| 5,453,649 A | * | 9/1995 | Blanchet ...................... | 310/71 |
| 6,124,652 A | * | 9/2000 | Karasa et al. ................ | 310/50 |
| 6,429,553 B1 | * | 8/2002 | Taniguchi et al. ........ | 310/67 R |

FOREIGN PATENT DOCUMENTS

| | | |
|---|---|---|
| JP | 09-019127 | 1/1997 |
| JP | 2000-134851 | 5/2000 |
| WO | 98/58825 | 12/1998 |

* cited by examiner

*Primary Examiner*—Dang Le
(74) *Attorney, Agent, or Firm*—Wenderoth, Lind & Ponack, L.L.P.

(57) ABSTRACT

A connection part between brush side terminals and power side terminal pieces is disposed at either of positions L and R located laterally next to an axis of a motor and opposed to each other with respect to the axis. Both terminals are connected to each other through a connection unit detachably fitted to the brush side terminals and others and the power side terminal pieces and others. The connection unit has male terminals to be coupled to the brush side terminal and others, female terminals to be coupled to the power side terminal piece and others, and a coil part for noise prevention connecting the male terminal and others to the female terminal and others. The connection part can be set to the position L or R by rotating the brush holder in a circumferential direction, which makes it possible to use the connection unit at any of these positions. Thus, the brush holder unit can be shared in electric motors having a speed reduction mechanism with different specifications to reduce a product cost.

11 Claims, 11 Drawing Sheets

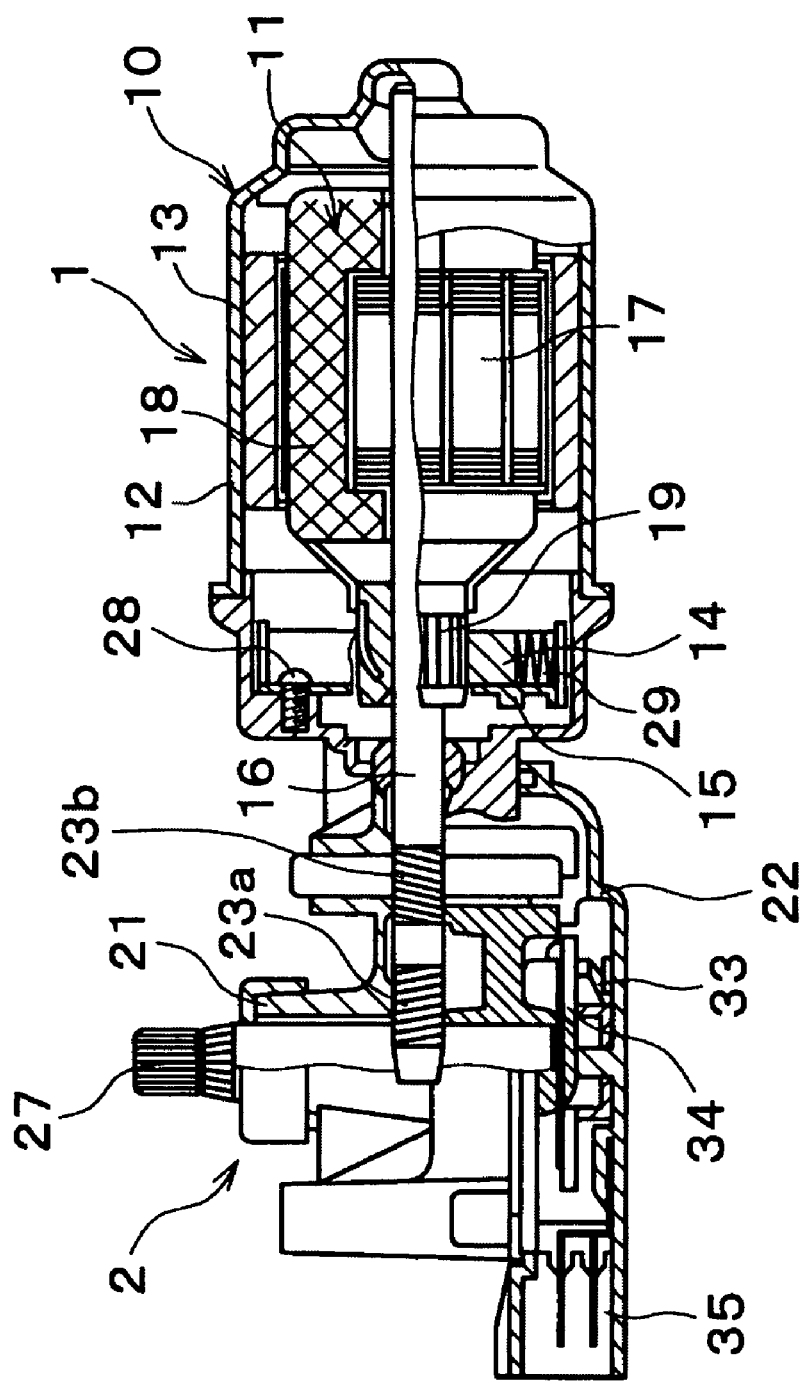
F I G. 1

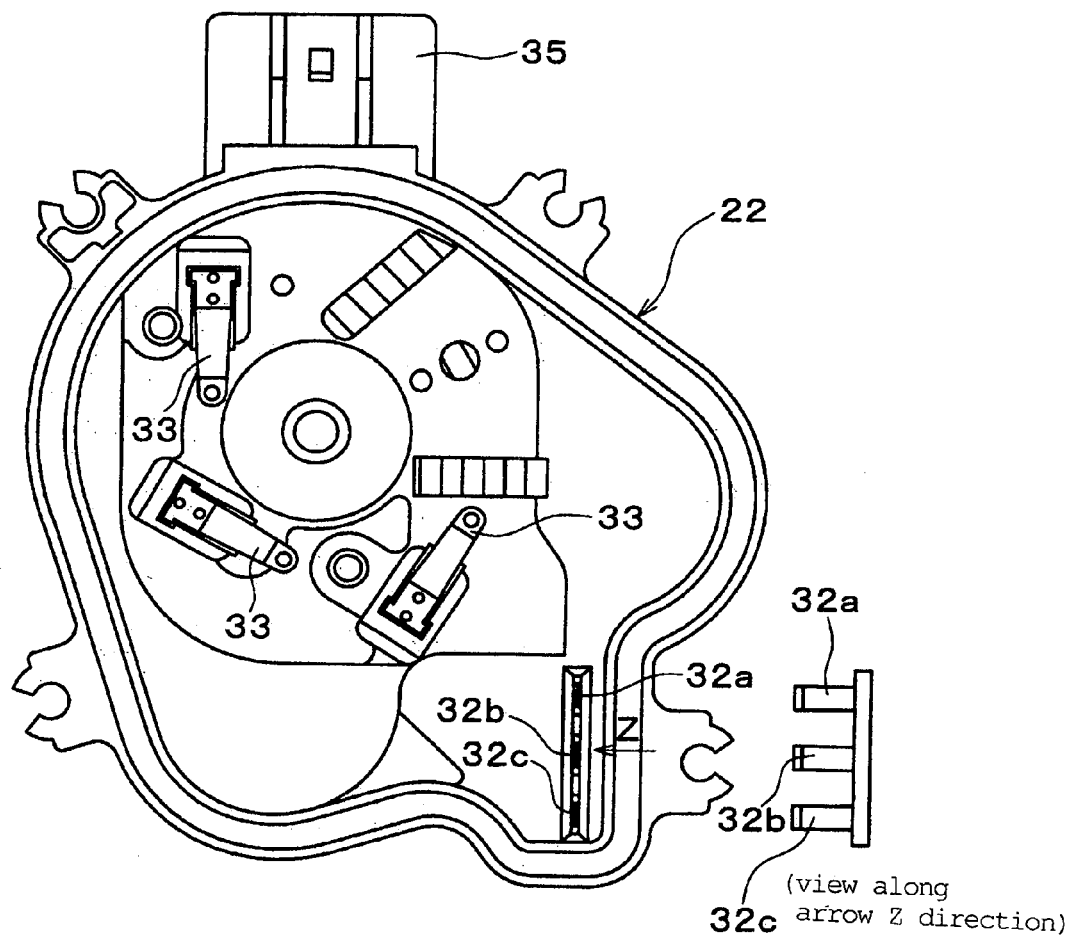
F I G. 6

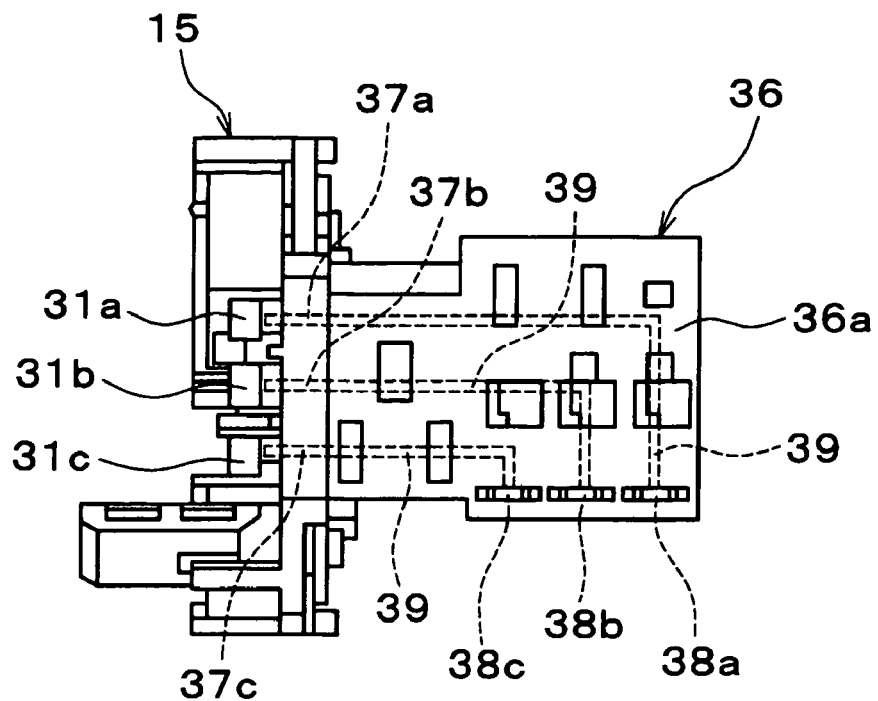
F I G. 10
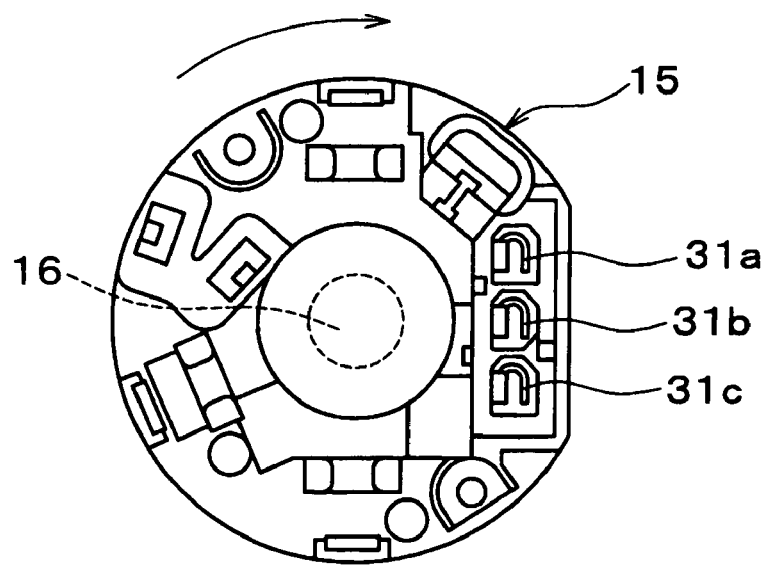
F I G. 11

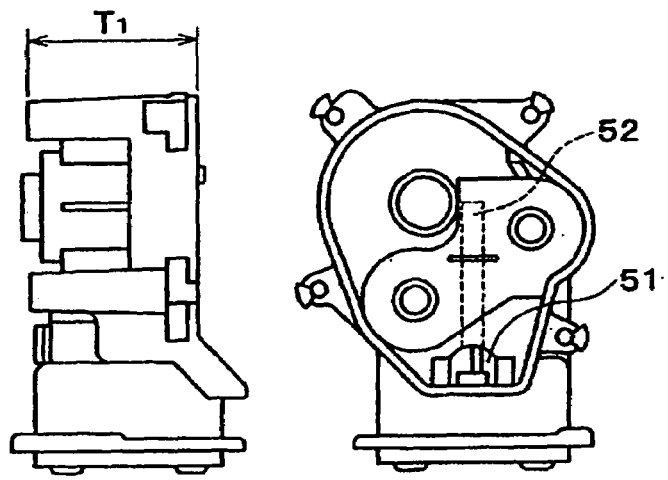
F I G. 1 3(a)
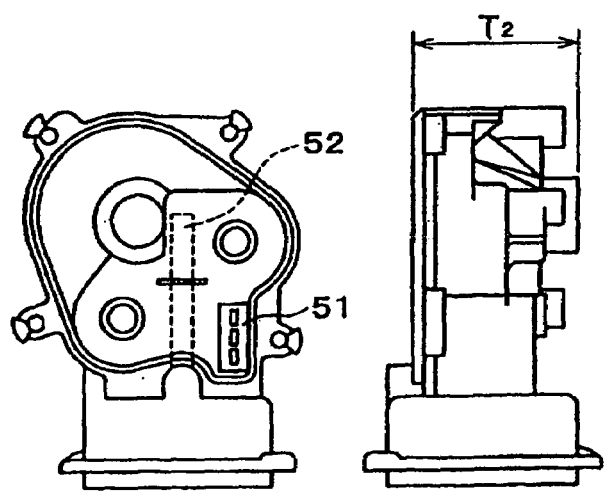
F I G. 1 3(b)

TERMINAL CONNECTION PART STRUCTURE OF ELECTRIC MOTOR WITH SPEED REDUCTION MECHANISM

TECHNICAL FIELD

The present invention relates to a terminal connection part structure of an electric motor with a speed reduction mechanism, which is used in an electric component of a car such as a wiper.

BACKGROUND ART

Generally, such an electric motor having a speed reduction mechanism includes an electric motor and a speed reduction mechanism that decelerates rotational speed of the electric motor, as is disclosed in Jpn. Pat. Appln. Laid-Open Publication No. 8-275441. The speed reduction mechanism includes a case frame having housed therein a worm deceleration mechanism and a bearing for supporting a motor shaft, and a case cover that is attached to the case frame along the direction of the motor shaft. The case frame has a brush holder fixed thereto, in which a brush that slidably comes into contact with a commutator of the electric motor is housed. The brush holder is provided with brush side terminals to be electrically connected to the brush. On the other hand, the case cover is provided with power side terminals to be electrically connected to a lead wire for supplying power. These brush side terminals and power side terminals are arranged above the motor shaft. When the case cover is fixed to the case frame, these terminals are coupled to each other to electrically connect the power-supplying lead wire and the brush.

On the other hand, since the electric motor having a speed reduction mechanism has these terminals arranged above its motor shaft, the size above the motor shaft is increased by the size of these terminals, which undesirably increases the thickness of the electric motor. So as to reduce the size and thickness of the electric motor, the position of these terminals is shifted from above the motor shaft to laterally next to the motor shaft, thereby reducing the size above the motor shaft. FIGS. 13(a) and 13(b) show explanatory diagrams for explaining the conventional electric motors having speed reduction mechanism. FIG. 13(a) shows an electric motor of a center connecting type in which terminals 51 are arranged above a motor shaft 52, while FIG. 13(b) shows an electric motor of a side connecting type in which the terminals 51 are arranged laterally next to the motor shaft 52. As is apparent from FIG. 13, when the arrangement of the terminals 51 is changed from the center connecting to the side connecting type, the electric motor has its thickness reduced by the size of these terminals (that is, the thickness of the electric motor is reduced from $T_1$ to $T_2$).

However, there are an electric motor having speed reduction mechanism of a right side terminal type and that of a left side terminal type due to the condition of designing, which are under the relationship similar to the case of an image and its mirrored image, as shown in FIGS. 14(a), 14(b). Thus, if the terminals 51 are of a side connecting type shown in FIG. 13(b), right side specification and left side specification are necessary for not only case frames and case covers but also brush holders provided with brush side terminals. That is, parts of the same kind have to be manufactured for the respective specifications, which undesirably increase the kind of parts. Furthermore, dies have to be prepared individually, which undesirably increases the manufacturing cost.

Accordingly, the present invention has an object to share a brush holder in electric motors having a speed reduction mechanism which are of different specifications so as to reduce the manufacturing cost.

SUMMARY OF THE INVENTION

According to the present invention, there is provided a terminal connection part structure of an electric motor with a speed reduction mechanism, including a case frame, in which a speed reduction mechanism for decelerating rotational speed of an electric motor is housed. The case frame has a brush holder for holding a brush which slidably comes into contact with a commutator of the electric motor and brush side terminals electrically connected to the brush. The terminal connection part structure also includes a case cover that is attached to the case frame and has power side terminals electrically connected to a power source, in which a connection part between the brush side terminals and the power side terminals is disposed at either of a first position and a second position located laterally next to a rotation shaft of the electric motor and opposed to each other with respect to the shaft.

A connection unit, which is independent of the brush side terminals and the power side terminals and has first terminals to be coupled to the brush side terminals, second terminals to be coupled to the power side terminals, and jumper lines for connecting the first terminals and the second terminals, is provided so as to be detachably fitted to the brush side terminals and the power side terminals at the first position or the second position.

According to the present invention, since the connection unit is independent of the brush holder, and can be attached to or detached from the brush side terminals and the power side terminals at the first position or the second position, even though different specifications corresponding to the first position and the second position exist, directional issue can be overcome by the brush holder and the connection unit. Thus, the brush holder can be shared between the different specifications. So, the kind of parts can be reduced, and dies do not have to be prepared individually, which can reduce the die manufacturing cost, thereby reducing the product cost.

According to the terminal connection part structure of an electric motor with a speed reduction mechanism, the connection part may be set to the first position or the second position by rotating the brush holder in a circumferential direction around the rotation shaft.

According to the terminal connection part structure of an electric motor with a speed reduction mechanism, the first and second positions may be located at symmetrical positions with respect to the rotation shaft of the electric motor.

According to the terminal connection part structure of an electric motor with a speed reduction mechanism, the jumper lines may have coils for preventing noise. In addition, the electric motor having a speed reduction mechanism may be used as a drive unit of a wiper of an automobile.

BRIEF DESCRIPTION OF THE DRAWINGS

FIG. 1 shows an explanatory diagram of an electric motor having a speed reduction mechanism employing the terminal connection part structure of an embodiment of the present invention;

FIG. 6 shows a plan view of the case cover of FIG. 1 when viewed from above;

FIG. 10 shows a front view of the state in which the connection unit is attached to the brush holder;

FIG. 11 shows a front view of the state in which the connection unit is attached to the brush holder;

FIGS. 13(*a*) and 13(*b*) show explanatory diagrams for explaining the conventional electric motors a having speed reduction mechanism, and FIG. 13(*a*) shows an electric motor of a center connecting type in which terminals are arranged above a motor shaft, while FIG. 13(*b*) shows an electric motor of side connecting type in which the terminals are arranged laterally next to the motor shaft.

DETAILED DESCRIPTION OF THE INVENTION

Figure 2:
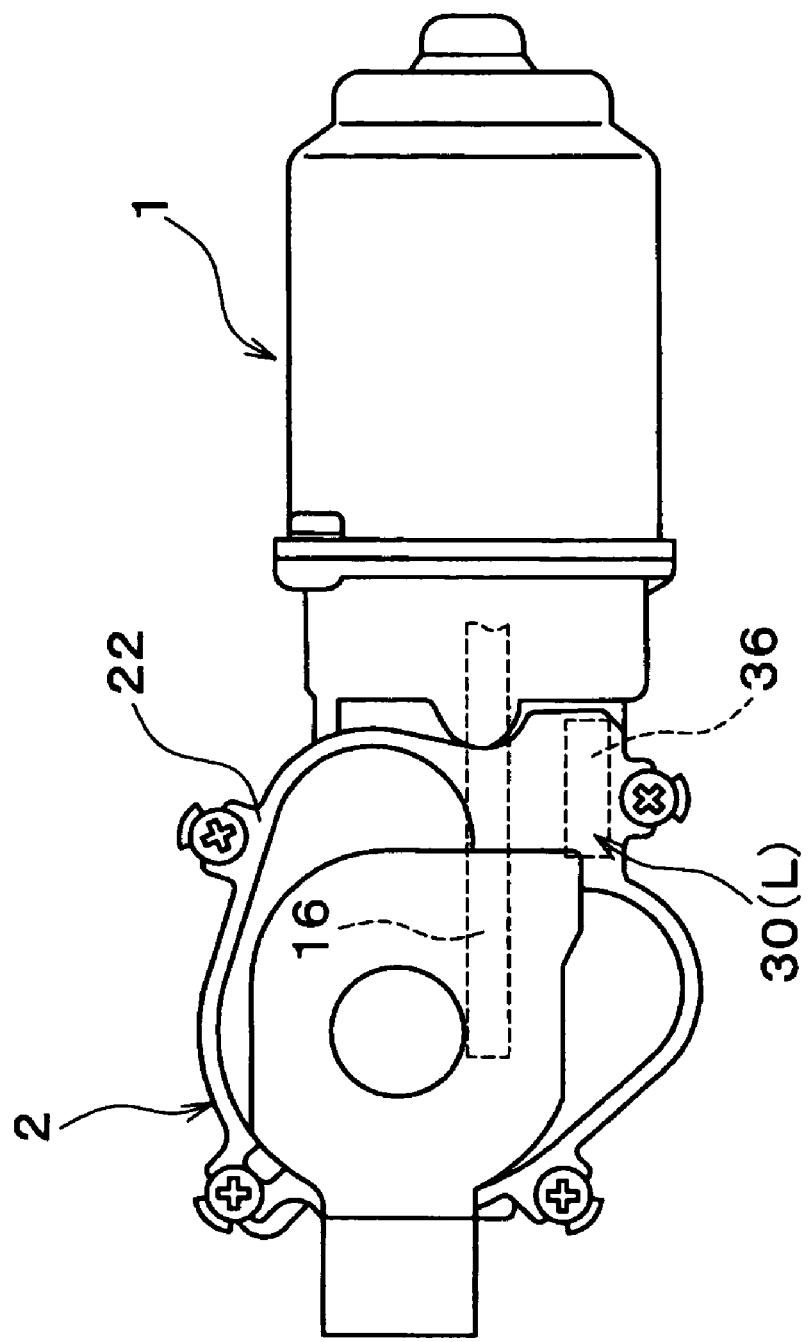
FIG. 2 shows a bottom view of the electric motor having a speed reduction mechanism shown in FIG. 1.

An embodiment of the present invention will be described below with reference to the accompanying drawings. FIG. 1 shows an explanatory diagram of an electric motor having a speed reduction mechanism employing the terminal connection part structure of the embodiment of the present invention, while FIG. 2 shows a bottom view of the electric motor having a speed reduction mechanism shown in FIG. 1. The electric motor having a speed reduction mechanism shown in FIG. 1 and FIG. 2 is used as a drive unit of a wiper of an automobile, and includes an electric motor 1 and a speed reduction mechanism 2. The rotational speed of the electric motor 1 is decelerated by the speed reduction mechanism 2, and then a wiper mechanism, not shown, is driven.

The electric motor 1 includes a stator 10 and a rotor 11. The stator 10 has a yoke 12 in the shape of a cylinder with a bottom, a permanent magnet 13 fixed on the inner surface of the yoke 12, a brush 14, and a brush holder 15 that holds the brush 14. The rotor 11 has a motor shaft (rotation shaft) 16 that is pivotably supported within the stator 10, an armature core 17 fixed to the motor shaft 16, a coil 18 wound around the armature core 17, and a commutator 19 located next to the armature core 17 and fixed to the motor shaft 16. The commutator 19 slidably comes into contact with the brush 14. The basic configuration of these components is similar to that of the general conventional electric motor.

Figure 3:
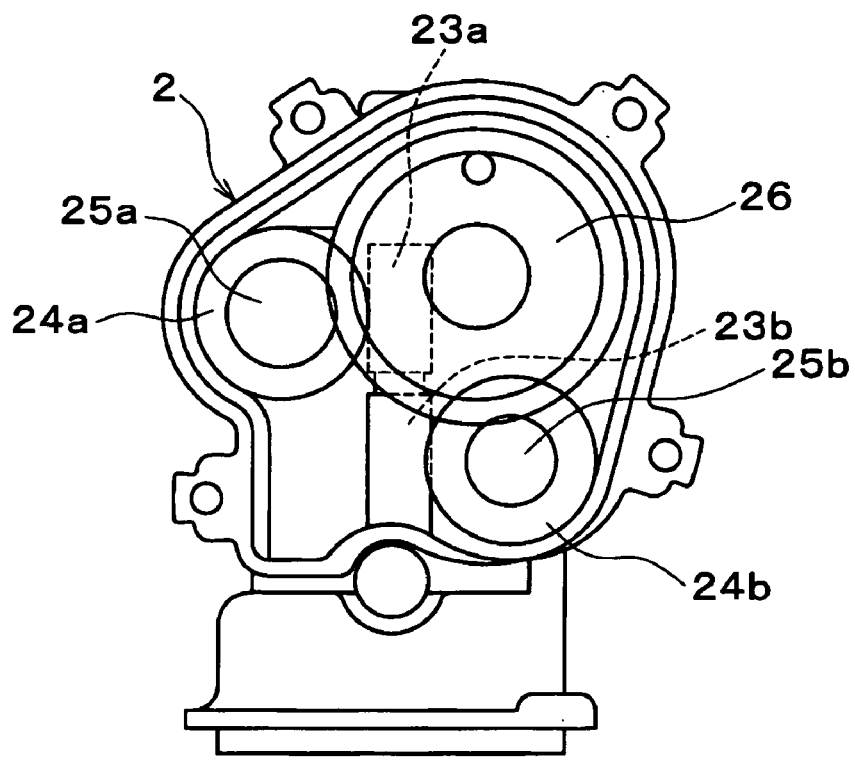
FIG. 3 shows an explanatory diagram for explaining the configuration of a speed reduction mechanism when viewed from the bottom thereof with its case cover removed.

The speed reduction mechanism 2 includes a case frame 21 that is integrally fixed to the open side end of the yoke 12, and a case cover 22 in the shape of a cover that is fixed to the bottom of the case frame 21. The case frame 21 has built therein a worm deceleration mechanism for decelerating rotational speed of the motor shaft 16 to output thus decelerated rotational speed. FIG. 3 shows an explanatory diagram for explaining the configuration of the speed reduction mechanism 2 when viewed from the bottom thereof with its case cover 22 removed.

As shown in FIG. 3, the motor shaft 16 protrudes from the yoke 12 into the inside of the case frame 21. The motor shaft 16 has formed on the end portion thereof a couple of worms 23*a*, 23*b* having thread grooves whose spiral directions are opposite to each other. These worms 23*a*, 23*b* are engaged with a couple of worm wheels 24*a*, 24*b* that are pivotably supported at the bottom of the case frame 21, respectively. The worm wheels 24*a*, 24*b* have first gears 25*a*, 25*b* of small diameter integrally arranged on shafts thereof, which are engaged with a second gear 26 of large diameter. The second gear 26 is integrally fixed to an output shaft 27 that is pivotably supported at the bottom of the case frame 21. The output shaft 27 is connected to a wiper mechanism, not shown. Driving force of the electric motor 1 is transmitted to the output shaft 27 through the worms 23*a*, 23*b*, worm wheels 24*a*, 24*b*, first gears 25*a*, 25*b*, and second gear 26 with its rotational speed decelerated to operate a wiper.

Figure 4:
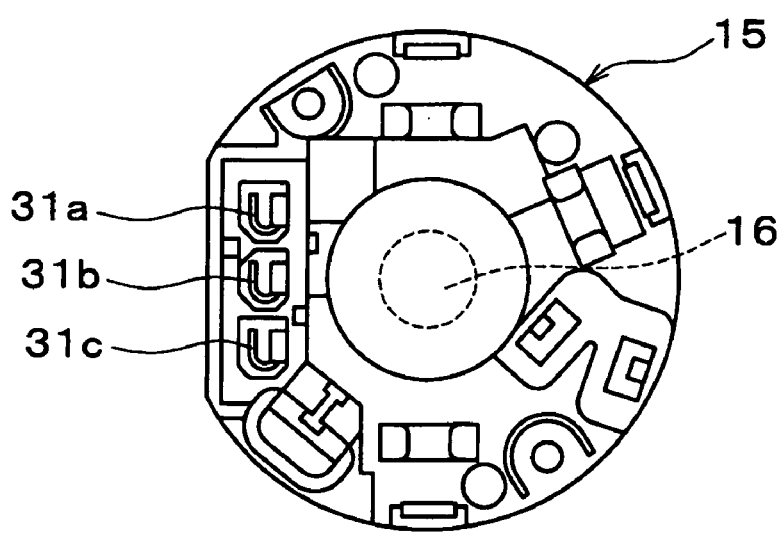
FIG. 4 shows a side view of a brush holder when viewed from a case frame side.
Figure 5:
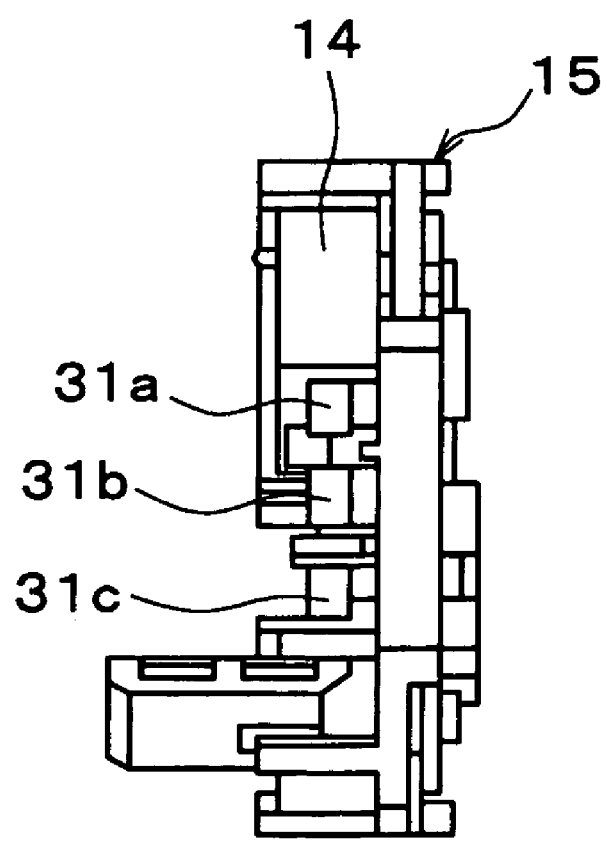
FIG. 5 shows a front view of the brush holder.

To the end of the case frame 21, located next to the yoke 12 side, the brush holder 15 is fixed by means of a screw 28. FIG. 4 shows a side view of the brush holder 15 when viewed from the case frame 21 side, while FIG. 5 shows a front view thereof. The brush holder 15 has the brush 14 movably supported therein along the inner and outer diameter. The brush 14 is biased toward the commutator 19 by a spring 29. The brush holder 15 is provided with brush side terminals 31*a* to 31*c* for supplying power to the brush 14. The respective brush side terminals 31*a* to 31*c* are connected to three pigtails of the brush 14, which are intended for high speed, low speed, and ground, respectively, through a conductive plate, not shown.

To the bottom of the case frame 21, the case cover 22 is so attached as to cover the open space thereof. FIG. 6 shows a plan view of the case cover 22 of FIG. 1 when viewed from above (FIG. 2 or a bottom view and FIG. 6 are under the relationship of an image and its mirrored image). The case cover 22 is provided with power side terminal pieces 32*a* to 32*c* protruding from the bottom thereof which are to be electrically connected to the brush side terminals 31*a* to 31*c* of the brush holder 15. The case cover 22 is provided with contact plates 33 each in the form of a flat spring. The contact plates 33 slidably come into contact with a relay plate 34 that rotates unitedly with the second gear 26. Of the power side terminal pieces 32*a* to 32*c*, one, or 32*c* is electrically connected to a power source connection terminal 35 that is to be connected to a power source such as a battery through the contact plates 33 and relay plate 34, while the other two, or 32*a*, 32*b* are electrically connected to the power source connection terminal 35 through a conductive plate integrally formed inside the case cover 22. When the electric motor 1 is driven and the second gear 26 is made to pivot forward and backward, the contact plates 33 come into contact or break contact with a conductive portion of the relay plate 34 to control the electric motor 1.

Figure 7:
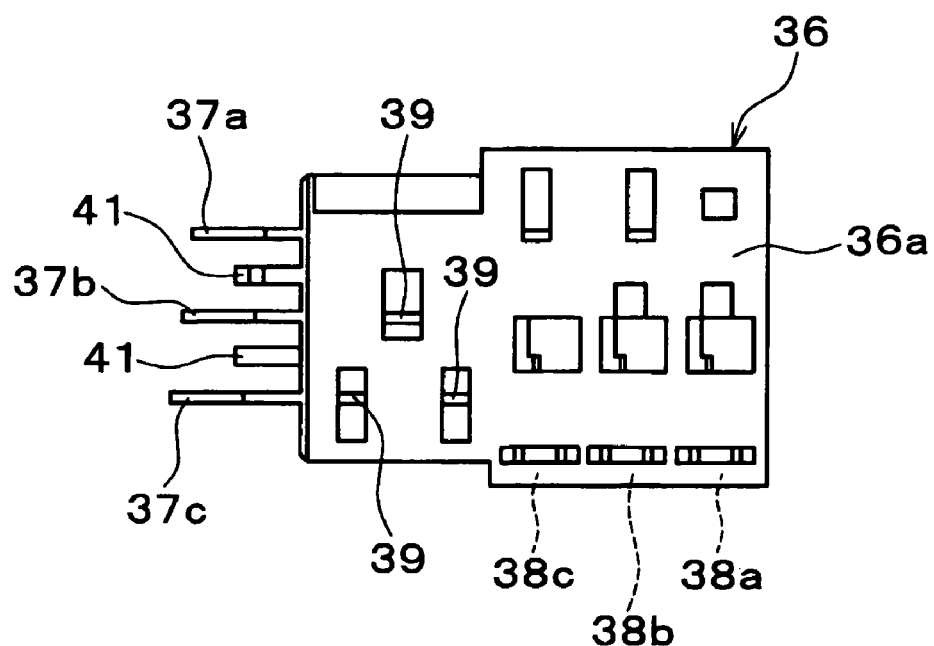
FIG. 7 shows a front view of a connection unit.
Figure 8:
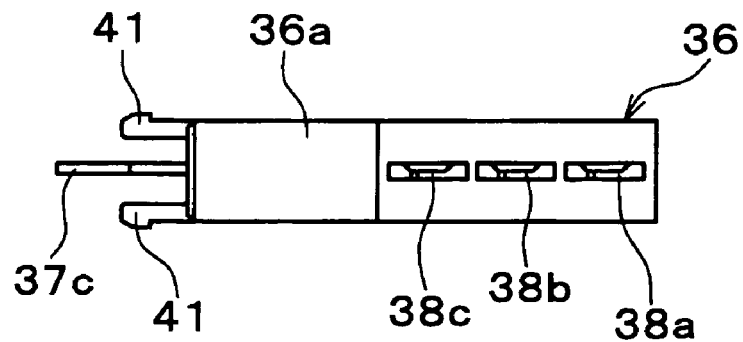
FIG. 8 shows a bottom view of the connection unit.

Between the brush side terminals 31*a* to 31*c* and the power side terminal pieces 32*a* to 32*c*, there is formed a connection part 30 to which a connection unit 36 is attached. FIG. 7 and FIG. 8 show a front view and a bottom view of the connection unit 36, respectively. The connection unit 36 can be attached to or detached from the brush holder 15 and the case cover 22, and has a housing 36*a* made of synthetic resin on which metallic terminals and coils are formed, as shown in FIG. 7.

The connection unit 36 has formed on the side thereof three male terminals 37*a* to 37*c*, or first terminals, which are to be coupled to the brush side terminals 31*a* to 31*c*. The connection unit 36 has formed on the same side thereof engagement chips 41 that are to engage with the brush holder 15 to prevent the connection unit 36 from falling down. The connection unit 36 has formed on the bottom thereof three female terminals 38*a* to 38*c*, or second terminals, which are to be coupled to the power side terminal pieces 32*a* to 32*c*. Furthermore, between the male terminals 37*a* to 37*c* and the female terminals 38*a* to 38*c*, there are wired jumper lines 39 for electrically connecting these terminals. The jumper lines 39 may be electrically connected to coils for preventing noise from the electric motor 1.

In the electric motor having speed reduction mechanism, firstly, the brush holder 15 is fixed to the case frame 21. Next, the yoke 12 of the electric motor 1 is attached to the case frame 21. And, the worm wheels 24*a*, 24*b*, first gears 25*a*, 25*b*, second gear 26, and output shaft 27 are arranged in the case frame 21. Then, the connection unit 36 is attached to the brush holder 15, and the case cover 22 provided with the contact plates 33 or the like is attached to the case frame 21.

Figure 9:
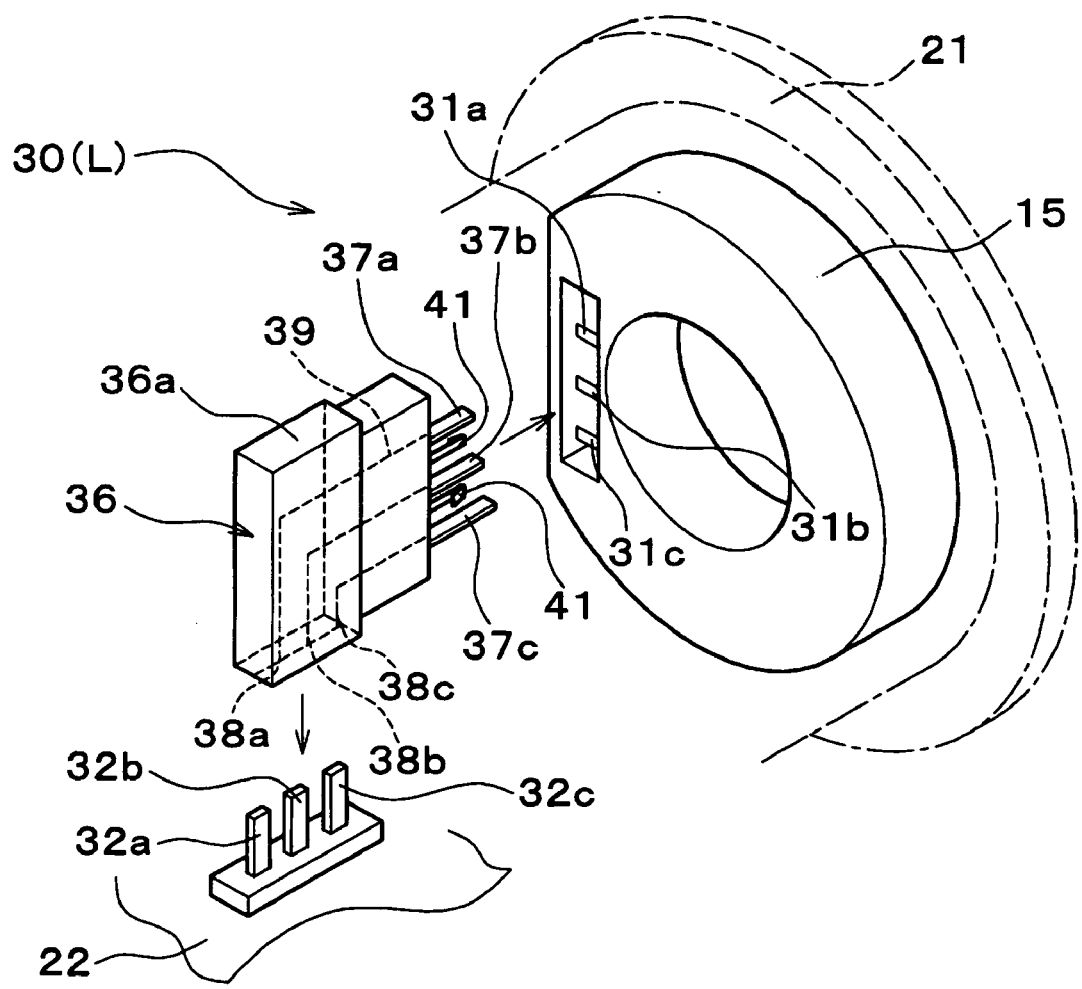
FIG. 9 shows an explanatory diagram for schematically explaining the attachment of the connection unit.

FIG. 9 shows an explanatory diagram for schematically explaining the attachment of the connection unit 36, in which the brush holder 15 is viewed form the case frame 21 side. FIG. 10 shows a front view of the state in which the connection unit 36 is attached to the brush holder 15. In FIG. 9, so as to straightforwardly show the configuration, main portions alone are shown as for the brush holder 15 or the like. As shown in FIG. 9, the connection unit 36 is attached to the brush holder 15 fixed to the case frame 21 along the direction of the motor shaft, and the male terminals 37*a* to 37*c* are inserted into the brush side terminals 31*a* to 31*c*, resulting in the state shown in FIG. 10. Then, when the case cover 22 is attached to the case frame 21, the power side terminal pieces 32*a* to 32*c* of the case cover 22 are inserted into the female terminals 38*a* to 38*c* of the connection unit 36. Thus, the power side terminal pieces 32*a* to 32*c* and the brush side terminals 31*a* to 31*c* (that is, the power source of the case cover 22 and the brush holder 15) are electrically connected through the jumper lines 39 of the connection unit 36.

Figure 14A:
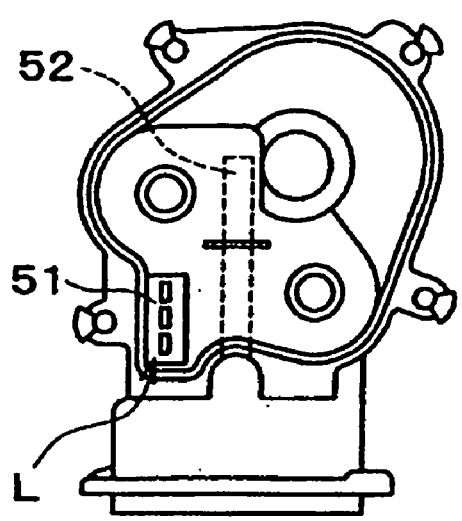
FIGS. 14(*a*) and 14(*b*) show two specifications of electric motors having a speed reduction mechanism, and FIG. 14(*a*) shows an image of a first side and FIG. 14(*b*) shows a mirrored image of a second side.
Figure 14B:
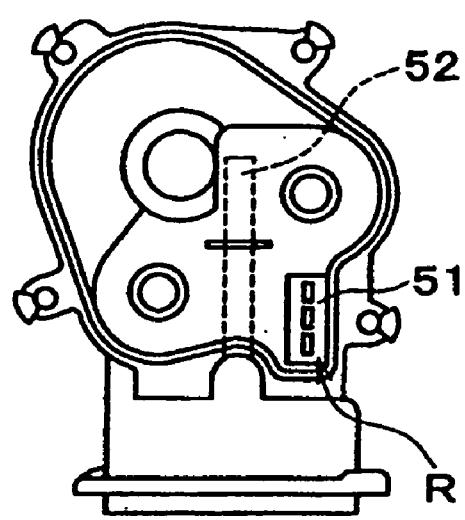

In the electric motor having a speed reduction mechanism, the side connecting is employed. The brush side terminals 31*a* to 31*c* and the power side terminal pieces 32*a* to 32*c* are arranged laterally next to the motor shaft 16 (that is, along the direction perpendicular to the axis directions of the motor shaft 16 as well as the output shaft 27). When employing the side connecting, as described above, there may be formed electric motors of a right side terminal type and a left side terminal type, which are under the relationship of an image and its mirrored image, as shown in FIG. 14. The electric motor shown in FIG. 1 corresponds to the configuration shown in FIG. 14(*a*), and the brush side terminal 31*a* etc. are arranged at the left side, or a first position L when viewed from the lower side of the motor shaft 16 in FIG. 2 and FIG. 3.

Figure 12:
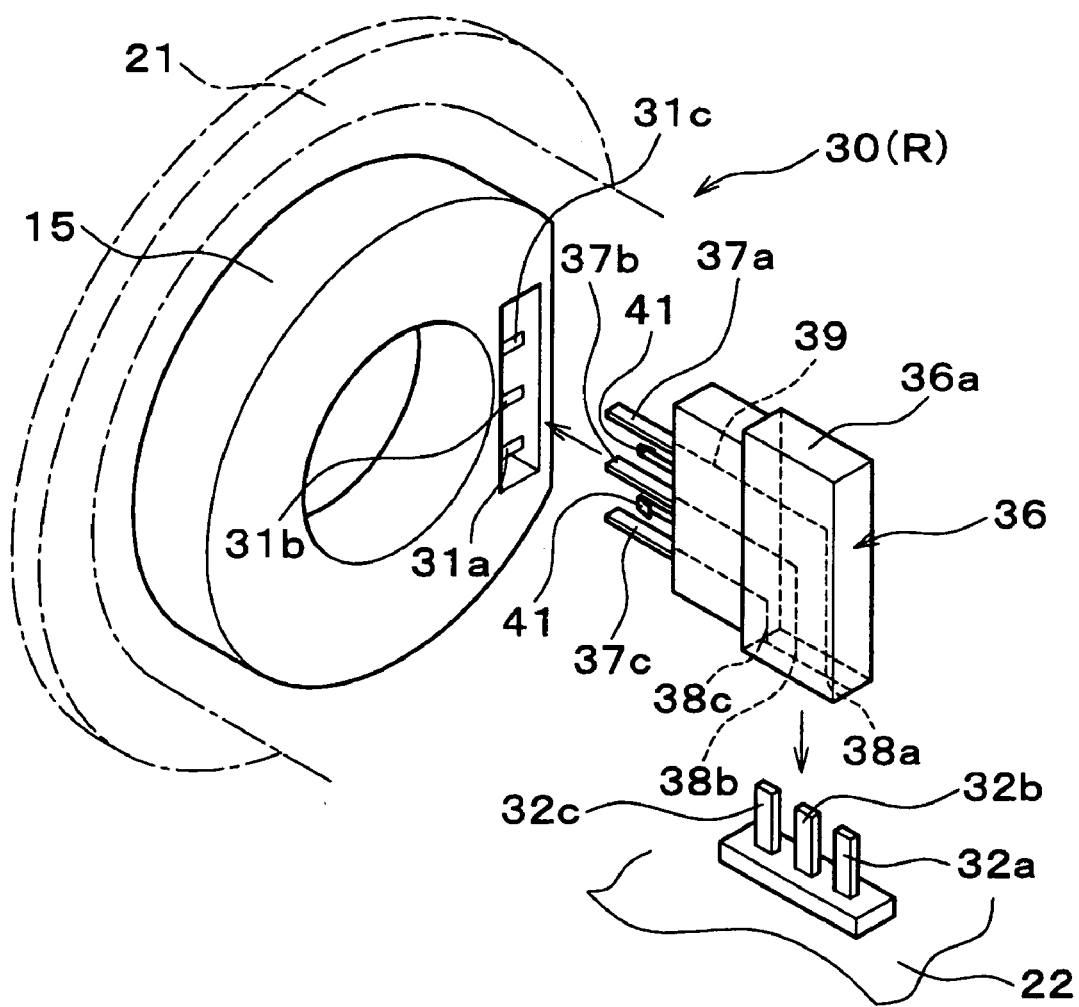
FIG. 12 shows an explanatory diagram for schematically explaining the attachment of the connection unit employing another specification.

When employing the configuration shown in FIG. 14(*b*), as compared with the configuration shown in FIG. 14(*a*), the connection part 30 is formed at the opposite position when viewed from the motor shaft 16. That is, the connection part 30 is arranged at the right side, or a second position R when viewed from the bottom of the motor shaft 16. So, right side specification and left side specification, which are under the relationship of an image and its mirrored image, are necessary for not only case frames 21 and case covers 22 but also brush holders 15. On the other hand, according to the electric motor having a speed reduction mechanism of the present invention, since the connection unit 36 can be attached to or detached from the brush holder 15 and the case cover 22, the brush holder 15 can be shared between these configurations. So, dedicated brush holders 15 do not have to be manufactured for the respective specifications. That is, when employing the configuration shown in FIG. 14(*b*), the brush holder 15 used in the configuration shown in FIG. 14(*a*) is rotated by 180 degrees, and the brush side terminals 31*a* to 31*c* are arranged at the right side of the motor shaft 16, as shown in FIG. 11. Then, the connection unit 36 is attached to the brush holder 15, as shown in FIG. 12, resulting in the configuration shown in FIG. 14(*b*). Since the brush holder 15 is rotated by 180 degrees, the male terminals 37*c*, 37*a* are inserted into the brush side terminals 31*a*, 31*c*, respectively.

Thus, according to the present invention, since the connection unit 36 is independent of the brush holder 15, and can be attached to or detached from the brush side terminals 31*a* to 31*c* and the power side terminal pieces 32*a* to 32*c* at the L position or the R position, directional issues can be overcome by properly arranging the connection unit 36 and the brush holder 15. Thus, even if there exist electric motors of different specifications, which are under the relationship of an image and its mirrored image, the brush holder 15 can be shared between the different specifications. Accordingly, the kind of parts can be reduced, and dies do not have to be prepared individually, which can reduce the die manufacturing cost, thereby reducing the product cost.

The present invention is not limited to the above-mentioned embodiments. It is further understood by those skilled in the art that various changes and modifications may be made in the present invention without departing from the spirit and scope thereof.

For example, in above-described embodiment, the electric motor having a speed reduction mechanism of the present invention is used as a motor of a wiper. On the other hand, the electric motor can be used for various units other than the wiper such as an automatic window apparatus which has different specifications under the relationship of an image and its mirrored image.

Furthermore, so as to cope with different specifications, the brush holder 15 is rotated by 180 degrees in the embodiments. On the other hand, two sets of the brush side terminals 31*a* to 31*c* may be arranged at the right and left sides of the brush holder 15, under which configuration the brush holder 15 may not have to be rotated. In this case, the first position and the second position do not have to be under the relationship of an image and its mirrored image, and are not restricted to symmetrical positions under the relationship of an image and its mirrored image.

INDUSTRIAL APPLICABILITY

According to the electric motor having a speed reduction mechanism of the present invention, in which the connection part between the brush side terminals and the power side terminals is disposed, either of the first position and the second position located laterally next to the rotation shaft of the electric motor and opposed to each other with respect to the shaft, since the connection unit is independent of the brush holder, and detachably fitted to the brush side terminals and the power side terminals at the first position or the second position, even though different specifications corresponding to the first position and the second position exist, directional issues can be overcome by the brush holder and the connection unit. Thus, the brush holder can be shared between the different specifications. Accordingly, the number of types of parts can be reduced, and dies do not have to be prepared individually, which can reduce the die manufacturing cost, thereby reducing the product cost.

The invention claimed is:

1. A terminal connection part structure of an electric motor with a speed reduction mechanism, comprising:
a case frame, in which a speed reduction mechanism for decelerating rotational speed of an electric motor is housed, said case frame having a brush holder for holding a brush which slidably comes into contact with a commutator of the electric motor and brush side terminals electrically connected to the brush;
a case cover attached to said case frame and having power side terminals electrically connected to a power source, a connection part between said brush side terminals and said power side terminals being disposed at either of a first position and a second position located laterally next to a rotation shaft of the electric motor and opposed to each other with respect to the shaft; and
a connection unit independent of said brush side terminals and said power side terminals and having first terminals to be coupled to said brush side terminals, second terminals to be coupled to said power side terminals, and jumper lines for connecting said first terminals and said second terminals, said connection unit being detachably fitted to said brush side terminals and said power side terminals at the first position or the second position.

2. The terminal connection part structure of an electric motor with a speed reduction mechanism as set forth in claim 1, wherein said connection part is operable to be set to the first position or the second position by rotating said brush holder in a circumferential direction around the rotation shaft.

3. The terminal connection part structure of an electric motor with a speed reduction mechanism as set forth in claim 2, wherein the first and second positions are located at symmetrical positions with respect to the rotation shaft of the electric motor.

4. The terminal connection part structure of an electric motor with a speed reduction mechanism as set forth in claim 2, wherein said jumper lines have coils for preventing noise.

5. The terminal connection part structure of an electric motor with a speed reduction mechanism as set forth in claim 2, wherein the electric motor having a speed reduction mechanism is operable to serve as a drive unit of a wiper of an automobile.

6. The terminal connection part structure of an electric motor with a speed reduction mechanism as set forth in claim 1, wherein the first and second positions are located at symmetrical positions with respect to the rotation shaft of the electric motor.

7. The terminal connection part structure of an electric motor with a speed reduction mechanism as set forth in claim 6, wherein said jumper lines have coils for preventing noise.

8. The terminal connection part structure of an electric motor with a speed reduction mechanism as set forth in claim 6, wherein the electric motor having speed reduction mechanism is operable to serve as a drive unit of a wiper of an automobile.

9. The terminal connection part structure of an electric motor with a speed reduction mechanism as set forth in claim 1, wherein said jumper lines have coils for preventing noise.

10. The terminal connection part structure of an electric motor with a speed reduction mechanism as set forth in claim 9, wherein the electric motor having speed reduction mechanism is operable to serve as a drive unit of a wiper of an automobile.

11. The terminal connection part structure of an electric motor with a speed reduction mechanism as set forth in claim 1, wherein the electric motor having a speed reduction mechanism is operable to serve as a drive unit of a wiper of an automobile.

* * * * *